(12) United States Patent
Iwakiri et al.

(10) Patent No.: US 6,864,316 B1
(45) Date of Patent: Mar. 8, 2005

(54) THERMOSETTING POWDER COATING COMPOSITION

(75) Inventors: Ryuji Iwakiri, deceased, late of Settsu (JP); by Miyuki Iwakiri, legal representative, Minoo (JP); Ryoichi Fukagawa, Settsu (JP); Keisuke Tano, Settsu (JP); Daisuke Tanizawa, Settsu (JP); Nobuhiko Tsuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/869,430
(22) PCT Filed: Oct. 14, 1999
(86) PCT No.: PCT/JP99/05654
§ 371 (c)(1),
(2), (4) Date: Jun. 28, 2001
(87) PCT Pub. No.: WO01/27208
PCT Pub. Date: Apr. 19, 2001

(51) Int. Cl.$^7$ ................................................ C08L 63/10
(52) U.S. Cl. .................. 525/111; 525/124; 525/131; 525/165; 525/176
(58) Field of Search ................ 525/111, 124, 525/131, 165, 176, 934

(56) References Cited

U.S. PATENT DOCUMENTS

| 4,818,791 A | * | 4/1989 | Murakami | ............... | 525/124 |
| 5,536,785 A | * | 7/1996 | Foukes | ............... | 525/176 |

FOREIGN PATENT DOCUMENTS

| EP | 0 301 557 A1 | 2/1989 | | |
| EP | 0 371 599 A2 | 6/1990 | | |
| JP | 557105442 | 6/1982 | | |
| JP | 58023838 A | * 2/1983 | ........... | C08L/21/00 |
| JP | 61-148208 | 7/1986 | | |
| JP | 3-95276 | 4/1991 | | |
| JP | 6-184243 | 7/1994 | | |

OTHER PUBLICATIONS

International Search Report for PCT/JP99/05654 dated Dec. 14, 1999.
International Preliminary Examination Report for PCT/JP99/05654 dated Jul. 7, 2000.
Office Action dated Sep. 12, 2003 in corresponding Australian Patent Application No. 61225/99.
Supplementary Partial European Search Report for EP 99 94 7883 dated Mar. 11, 2004.
English Derwent Abstract of JP 58–023838 A, Feb. 1983, Soei et al.*

* cited by examiner

Primary Examiner—Jeffrey B. Robertson
(74) Attorney, Agent, or Firm—Sughrue Mion, PLLC

(57) ABSTRACT

In the thermosetting powder coating composition prepared by a combination use of a fluorine-containing polymer and a polyester polymer and containing a curing agent, the fluorine-containing polymer (A) comprising a fluoroolefin unit and a vinyl ester unit and having a crosslinkable reactive group is used as the fluorine-containing polymer or the polyester polymer (I) containing isophthalic acid and/or 1,4-cyclohexane dicarboxylic acid as essential components and having a crosslinkable reactive group is used as the polyester polymer. By the use of this composition, weather resistance and an appearance of a coating film, for example, gloss and smoothness which are conflicting properties in the thermosetting powder coating composition can be enhanced and well balanced.

5 Claims, No Drawings

THERMOSETTING POWDER COATING COMPOSITION

TECHNICAL FIELD

The present invention relates to a thermosetting powder coating composition which comprises a thermosetting fluorine-containing resin and a thermosetting polyester resin as resin components for the powder coating composition and gives well-balanced excellent weather resistance and appearance of a coating film.

BACKGROUND ART

A thermosetting powder coating composition has been used widely in the field of coating for industrial use because it is free from an environmental problem since an organic solvent is not used and because it gives a coating film having excellent characteristics. Powder, coating compositions such as an acrylic resin and polyester are known as such a thermosetting powder coating composition.

However for example, an acrylic resin powder coating composition has merits such as a relatively low cost and excellent appearance of a coating film, but weather resistance thereof is insufficient. Also there is a problem that in case where the same coating line is used also for other resin powder coating composition, an appearance of a coating film is lowered by mixing of a small amount of the other resin powder coating composition. Therefore the coating line must be isolated for each of the coating compositions.

A polyester powder coating composition has also merits such as a relatively low cost, good pigment dispersibility and excellent appearance of a coating film, but there are problems that weather resistance thereof is more insufficient than the acrylic resin powder coating composition and is difficult to be used for coating for outdoor use.

As a powder coating composition being excellent in weather resistance, there is known a thermosetting fluorine-containing resin powder coating composition (JP-B-6-104792, JP-A-6-345822, JP-A-6-184243, etc.). However the thermosetting fluorine-containing resin powder coating composition is high in cost, insufficient in adhesion to a substrate and inferior in an appearance of a coating film, particularly smoothness thereof and also has a problem with storage stability because blocking easily occurs.

In order to eliminate those problems, studies have been made. For example, in case of a polyester powder coating composition, there are attempts that neopentyl glycol is used as a polyol component and isophthalic acid is used as a polycarboxylic acid component in order to enhance weather resistance (JP-A-9-71738, JP-A-11-100548). However when amounts of neopentyl glycol and isophthalic acid components are increased, weather resistance is enhanced though it is inferior as compared with the fluorine-containing resin, but there is a problem that a flexibility and also physical properties of a coating film are lowered.

There is a proposal to solve those problems by blending a fluorine-containing resin with a polyester resin (Japanese Patent No. 2886914). In that invention, a blend of a fluorine-containing resin having hydroxyl group and polyester resin having hydroxyl group is disclosed. However in such a resin blend, adhesion and storage stability are improved, but a compatibility between a fluorine-containing polymer and a polyester polymer is insufficient, an appearance of a coating film is not improved and also weather resistance is not sufficient.

DISCLOSURE OF INVENTION

In the present invention the above-mentioned problems, particularly a problem of enhancing and well balancing weather resistance and appearance of a coating film are solved by the following means.

Namely the present invention relates to a thermosetting powder coating composition which is prepared by using a fluorine-containing polymer and a polyester polymer together and contains a curing agent, wherein the fluorine-containing polymer (A) comprising a fluoroolefin unit and vinyl ester unit and having a crosslinkable reactive group is used as a fluorine-containing polymer, or the polyester polymer (I) containing isophthalic acid and/or 1,4-cyclohexane dicarboxylic acid as the essential component unit and having a crosslinkable reactive group is used as a polyester polymer.

Hereinafter the former invention is referred to as "Invention 1", and the latter invention is referred to as "Invention 2".

Invention 1 is a thermosetting powder coating composition comprising the above-mentioned specific fluorine-containing polymer (A), a polyester polymer (B) having a crosslinkable reactive group and a curing agent. Particularly it is preferable that a molecular weight of the vinyl ester unit in the fluorine-containing polymer (A) is from 70 to 400 and that the above-mentioned vinyl ester unit is vinyl versatate unit and/or vinyl benzoate unit.

Invention 1 can enhance and well-balance weather resistance and appearance of the obtained coating film, can improve adhesion to a substrate and can provide a powder coating composition having excellent storage stability.

Further Invention 2 is a thermosetting powder coating composition comprising the above-mentioned specific polyester polymer (I), a fluorine-containing polymer (II) having a crosslinkable reactive group and a curing agent. It is preferable that the above-mentioned specific polyester polymer (I) is a polyester polymer containing isophthalic acid and/or 1,4-cyclohexane dicarboxylic acid as a polybasic acid component and a polyhydric alcohol as a polyol component, in which hydrogen at β position has been substituted by an alkyl group.

Invention 2 can enhance and well-balance weather resistance and appearance of the obtained coating film and further can provide a powder coating composition free from lowering of physical properties of the coating film, for example, flexibility.

BEST MODE FOR CARRYING OUT THE INVENTION

At first, Invention 1 is concretely explained below.

Invention 1 is characterized in that by mixing the thermosetting polyester polymer (B) to the thermosetting fluorine-containing polymer (A) comprising specific monomers, adhesion to a substrate, weather resistance and storage stability of the powder (anti-blocking property) are enhanced without lowering an appearance of a coating film.

The thermosetting fluorine-containing polymer (A) to be used in Invention 1 comprises a fluoroolefin unit and a vinyl ester unit as the essential components.

Examples of the fluoroolefin are, for instance, tetrafluoroethylene, monofluoroethylene, trifluoroethylene, vinylidene fluoride, hexafluoropropylene, pentafluoropropylene, chlorotrifluoroethylene, and the like. The fluoroolefin can be optionally selected depending on characteristics required for a coating film and a combination with other copolymer component or a curing agent. Also two or more of those fluoroolefins can be used. Particularly preferable fluoroolefins are perfluoroolefins such as tetrafluoroethylene and hexafluoropropylene and chlorotrifluoroethylene from the viewpoint of copolymerizability and weather resistance.

The vinyl ester unit to be contained as the essential component has a function of lowering a melting point or a glass transition temperature of the fluorine-containing polymer and thus further enhancing workability at coating, a function of imparting physical properties such as a proper hardness, flexibility and gloss to the coating film and a function of enhancing a compatibility with the polyester resin.

As such a vinyl ester unit, one which has an unsaturated group being active to an extent of being copolymerizable with the fluoroolefin and does not lower weather resistance of the coating film remarkably is used. Examples thereof are one or two or more of vinyl acetate, vinyl propionate, vinyl n-butyrate, vinyl iosbutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butyl benzoate, vinyl cyclohexanecarboxylate, vinyl monochloroacetate, vinyl adipate, vinyl acrylate, vinyl methacrylate, vinyl crotonate, vinyl sorbinate, vinyl cinnamate, vinyl undecylate, and the like. Among them, vinyl versatate and vinyl benzoate are preferable from the viewpoint of compatibility with the polyester resin.

It is preferable from the viewpoint of copolymerizability with the fluoroolefin that a molecular weight of the vinyl ester monomer is from 70 to 400, particularly 100 to 250.

A content of the vinyl ester unit is from 1 to 30% by weight, preferably 5 to 25% by weight based on the fluorine-containing polymer. If the content is more than that range, weather resistance is lowered, and if less than the mentioned range, a compatibility with the polyester resin is lowered.

The fluorine-containing polymer to be used in Invention 1 may be copolymerized with a comonomer as case demands. As such an optional monomer, ethylenically unsaturated compounds are suitable. Examples thereof are, for instance, alkyl vinyl ethers such as ethyl vinyl ether, propyl vinyl ether, butyl vinyl ether, isobutyl vinyl ether and cyclohexyl vinyl ether; alkyl allyl ethers such as ethyl allyl ether, propyl allyl ether, butyl allyl ether, isobutyl allyl ether and cyclohexyl allyl ether; alkyl allyl esters such as ethyl allyl ester, propyl allyl ester, butyl allyl ester, isobutyl allyl ester and cyclohexyl allyl ester; alkenes such as ethylene, propylene, butylene and isobutylene; acrylic acid and methacrylic acid; esters of acrylic acid or methacrylic acid such as ethyl acrylate, propyl acrylate, butyl acrylate, isobutyl acrylate, 2-ethylhexyl acrylate, ethyl methacrylate, propyl methacrylate, butyl methacrylate, isobutyl methacrylate and 2-ethylhexyl methacrylate; partly fluorine-substituted compounds thereof; and the like. Those optional comonomers may be used solely or in combination of two or more thereof.

As the optional comonomer, vinyl and ally compounds or alkenes which have excellent copolymerizability with the fluoroolefin are used preferably. When allyl alkyl esters or vinyl or allyl alkyl ethers are used, a linear, branched or alicyclic alkyl group having about 2 to about 10 carbon atoms can be used suitably.

Examples of the crosslinkable reactive group of the thermosetting fluorine-containing polymer (A) to be used in Invention 1 are hydroxyl group, carboxyl group, amido group, amino group, mercapto group, glycidyl group, isocyanate group, and the like. Examples of a method for introducing such a crosslinkable reactive group into the copolymer are a method of copolymerizing a monomer having a crosslinkable reactive group, a method of decomposing a part of the copolymer, a method of reacting a reactive group of the copolymer with a compound giving a crosslinkable reactive group thereto, and the like.

Examples of the comonomer which can introduce a suitable crosslinkable reactive group by copolymerization are, for instance, monomers having hydroxyl group or a group which can be converted to hydroxyl group and having a double bond being copolymerizable with the fluoroolefin. Examples thereof are one or two or more of hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; esters of vinyl alcohol and hydroxyalkylcarboxylic acid such as vinyl hydroxyacetate, vinyl hydroxypropionate, vinyl hydroxybutyrate, vinyl hydroxyvalerate, vinyl hydroxyisobutyrate and vinyl hydroxycyclohexanecarboxylate; hydroxyalkyl allyl ethers such as hydroxyethyl allyl ether, hydroxypropyl allyl ether, hydroxybutyl allyl ether, hydroxyisobutyl allyl ether and hydroxycyclohexyl allyl ether; hydroxyallyl esters such as hydroxyethyl allyl ester, hydroxypropyl allyl ester, hydroxybutyl allyl ester, hydroxyisobutyl allyl ester and hydroxycyclohexyl allyl ester; hydroxyalkyl esters of acrylic acid or methacrylic acid such as 2-hydroxyethyl acrylate, hydroxypropyl acrylate, 2-hydroxyethyl methacrylate and hydroxypropyl methacrylate; partly fluorine-substituted compounds thereof; and the like. One or two or more thereof may be selected and used as a comonomer for introducing hydroxyl group.

Examples of the comonomer having carboxyl group are, for instance, $\alpha,\beta$-unsaturated carboxylic acids such as acrylic acid, methacrylic acid, itaconic acid, fumaric acid, fumaric anhydride, crotonic acid, maleic acid, maleic anhydride and undecylenic acid and in addition, fluorine-substituted monomer such as perfluorobutenoic acid, carboxyl alkyl allyl ether such as allyloxy propionic acid, and the like. Also examples of the comonomer having glycidyl group are, for instance, glycidyl (meth)acrylate, glycidyl vinyl ether, glycidyl allyl ether, and the like. Examples of the comonomer having amino group are, for instance, amino alkyl vinyl ether, amino alkyl allyl ether, and the like. Examples of the comonomer having amido group are, for instance, (meth)acrylamide, methylolacrylamide, and the like. Examples of the comonomer having nitrile group are, for instance, (meth)acrylonitrile, and the like. Examples of the comonomer having isocyanate group are, for instance, vinyl isocyanate, isocyanate ethyl acrylate, and the like. Examples of the comonomer having an activated halogen group are, for instance, vinyl chloride, vinylidene chloride, and the like.

It is preferable to use particularly a vinyl or allyl ether or ester compound as a comonomer for introducing a crosslinkable reactive group from the viewpoint of excellent copolymerizability with the fluoroolefin.

Example of the method for partly decomposing the copolymer is a method of copolymerizing a monomer having a hydrolyzable ester group after polymerization and then hydrolyzing the copolymer to generate carboxyl group in the copolymer. Also it is possible to form crosslinkage directly by transesterification in a curing reaction without carrying out ester hydrolysis mentioned above.

As the method for reacting a compound giving a crosslinkable reactive group into the copolymer, for example, a method of introducing carboxyl group by reacting a divalent carboxylic acid anhydride such as succinic anhydride with a fluorine-containing copolymer having hydroxyl group can be employed suitably.

From the above-mentioned point of view, examples of the thermosetting fluorine-containing polymer (A) are, for instance, tetrafluoroethylene/cyclohexyl vinyl ether/vinyl versatate/hydroxybutyl vinyl ether copolymer, tetrafluoroethylene/cyclohexyl vinyl ether/vinyl benzoate/hydroxybutyl vinyl ether copolymer, tetrafluoroethylene/vinyl p-t-butylbenzoate/hydroxybutyl vinyl ether copolymer, tetrafluoroethylene/hexafluoropropylene/ethylene/vinyl versatate/hydroxybutyl vinyl ether copolymer, tetrafluoroethylene/hexafluoropropylene/ethylene/vinyl benzoate/hydroxybutyl vinyl ether copolymer, tetrafluoroethylene/hexafluoropropylene/ethylene/vinyl p-t-butylbenzoate/hydroxybutyl vinyl ether copolymer, chlorotrifluoroethylene/cyclohexyl vinyl ether/vinyl versatate/hydroxybutyl vinyl ether copolymer, chlorotrifluoroethylene/cyclohexyl vinyl ether/vinyl benzoate/hydroxybutyl vinyl ether copolymer, and the like.

It is desirable that the thermosetting fluorine-containing polymer (A) to be used for the thermosetting powder coating composition of Invention 1 has a fluorine content of not less than 10% by weight. When the fluorine content is less than 10% by weight, a coating film having a sufficient weather resistance cannot be obtained.

Also it is desirable that a MFR of the thermosetting fluorine-containing polymer (A) is within a range of from 0.1 to 100 g/10 min when measured at 100° to 180° C. When the MFR measured at 100° C. of a low temperature side is less than 0.1 g/10 min, meltability of the resin at kneading with other additives such as a pigment is not sufficient, and thus color developing property, weather resistance and impact resistance of the obtained coating film are inferior. When the MFR measured at 180° C. of a high temperature side is larger than 100 g/10 min, a viscosity of the resin at melt-kneading is lowered and the melt-kneading is not sufficient, and thus color developing property, weather resistance and impact resistance of the obtained coating film are also inferior.

Further it is desirable that the thermosetting fluorine-containing polymer (A) has a glass transition temperature of 30° to 120° C. When the glass transition temperature is not more than 30° C., storage stability of the obtained coating composition is not sufficient. When exceeding 120° C., melt-kneading property is lowered, thereby making it impossible to sufficiently disperse other additives such as a pigment at the melt-kneading step.

In Invention 1, as far as the above-mentioned specific polymer (A) is used as a thermosetting fluorine-containing polymer, the thermosetting polyester polymer (B) which is another resin component for the powder coating composition is not limited particularly when the polymer (B) has excellent weather resistance. Known polyester polymers having crosslinkable reactive group can be used.

Examples of the crosslinkable reactive group to be introduced into the thermosetting polyester polymer (B) are hydroxyl group, carboxyl group, and the like. Hydroxyl group and carboxyl group can be introduced in an optional amount by adjusting a reacting mole ratio of a polycarboxylic acid component and polyol component. A hydroxyl value thereof is from 14 to 100 mgKOH/g, preferably 25 to 60 mgKOH/g, and an acid value is from 15 to 50 mgKOH/g.

Examples of the thermosetting polyester polymer (B) are those comprising a polycarboxylic acid component and a polyol component. Examples of the polycarboxylic acid component are aromatic polycarboxylic acid, aliphatic polycarboxylic acid or acid anhydride thereof, and for instance, isophthalic acid, phthalic anhydride, terephthalic acid, succinic anhydride, adipic acid, sebacic acid, azelaic acid, 1,4-cyclohexanedicarboxylic acid, tetrahydrophthalic anhydride, hexahydrophthalic anhydride, trimellitic anhydride, and the like. Among those polycarboxylic acids, it is preferable to use polycarboxylic acids having a cyclic structure, particularly isophthalic acid and 1,4-cyclohexanedicarboxylic acid solely or in combination thereof from the viewpoint of enhancement of weather resistance.

As the polyol component, a polyol which has been used for synthesis of polyester can be used. Examples thereof are, for instance, aliphatic glycols such as ethylene glycol, diethylene glycol, propylene glycol, 1,4-butanediol, 1,6-hexanediol and 1,4-cyclohexanedimethanol. From the viewpoint of weather resistance, it is preferable to contain a polyol in which hydrogen at β position has been substituted by an alkyl group. Examples thereof are 2,2-dimethyl-1,3-propanediol (neopentyl glycol), 2-butyl-2-ethyl-1,3-propanediol, hydroxypivalyl hydroxypivalate, hydrogenated bisphenol A, 1,4-cyclohexanedimethanol, and the like. Also there are aromatic diols such as ethylene oxide adduct of bisphenol A and ethylene oxide adduct of bisphenol S and trivalent alcohols such as trimethylolpropane, glycerine and pentaerythritol as far as an amount thereof is small.

The thermosetting powder coating composition of Invention 1 comprises one or two or more of the above-mentioned thermosetting polyester polymers (B) and one or two or more of the specific fluorine-containing polymer (A) as the resin components. A mixing ratio (A)/(B) of the polymer (A) and the polymer (B) can be selected in a wide range of from 99/1 to 1/99 in a weight ratio, and is preferably from 99/1 to 50/50 from the viewpoint of an improvement in weather resistance of the polyester resin (B). When a proportion of the fluorine-containing polymer (A) is too small, a degree of enhancement of weather resistance is decreased. However when a specific polyester polymer (I) mentioned hereinafter is used as the polyester polymer (B), even if the ratio (A)/(B) is 1/99 to 50/50, preferably 25/75 to 50/50, weather resistance and appearance of a coating film which are balanced in conformity with a purpose can be obtained.

The thermosetting powder coating composition of Invention 1 can be prepared by adding a curing agent to the above-mentioned resin components. In addition, various additives which are used usually for a powder coating can be added. Since those curing agent and additives can be used also in Invention 2, explanation thereof is made hereinafter. Further a preparation process of the powder coating composition, article to be coated with the composition and coating method are common to those of Invention 2, and therefore are explained hereinafter.

Then Invention 2 is concretely explained below.

Invention 2 is characterized in that a specific thermosetting polyester polymer (I) containing isophthalic acid and/or 1,4-cyclohexanedicarboxylic acid as the essential component unit and having a crosslinkable reactive group is used as the thermosetting polyester polymer.

The polyester polymer (I) containing isophthalic acid and/or 1,4-cyclohexanedicarboxylic acid as the essential component unit is one in which isophthalic acid and/or 1,4-cyclohexanedicarboxylic acid are used as a polybasic acid component. Examples of usable polybasic acids in addition to the above-mentioned specific polybasic acids are aromatic polycarboxylic acids, aliphatic polycarboxylic acids, acid anhydrides thereof, and the like. Examples thereof are, for instance, phthalic anhydride, terephthalic anhydride, succinic anhydride, adipic acid, sebacic acid, azelaic acid, tetrahydrophthalic anhydride, hexahydrophthalic anhydride, trimellitic anhydride, and the like. Among those polycarboxylic acids to be used together, from the viewpoint of enhancing a mechanical strength such as impact resistance, it is preferable to use aromatic polycarboxylic acids, particularly terephthalic acid as a polybasic acid component to be added solely.

On the other hand from the viewpoint of further enhancing weather resistance, it is preferable to use, as a polyol component, a polyhydric alcohol, in which hydrogen at β position has been substituted with an alkyl group. Examples thereof are 2,2-dimethyl-1,3-propanediol (neopentyl glycol), 2-butyl-2-ethyl-1,3-propanediol, hydroxypivalyl hydroxypivalate, hydrogenated bisphenol A, 1,4-cyclohexanedimethanol, and the like. From the viewpoint of compatibility with the fluorine-containing resin having a crosslinkable reactive group, 2,2-dimethyl-1,3-propanediol and 2-butyl-2-ethyl-1,3-propanediol are preferable. Further polyols which have been used for synthesis of polyester can be used together. Examples thereof are, for instance, aliphatic glycols such as ethylene glycol, diethylene glycol, propylene glycol, 1,4-butanediol, 1,6-hexanediol and 1,4-cyclohexanedimethanol; aromatic diols such as ethylene oxide adduct of bisphenol A and ethylene oxide adduct of bisphenol S; and trivalent alcohols such as trimethylolpropane, glycerine and pentaerythritol. Among them, it is preferable to use 2,2-dimethyl-1,3-propanediol and 2-butyl-2-ethyl-1,3-propanediol solely or in combination thereof from the viewpoint of enhancing weather resistance and compatibility with the fluorine-containing polymer (II) having a crosslinkable reactive group.

As case demands, oxycarboxylic acid unit such as 4-hydroxy benzoate or ε-caprolactone may be contained as a component unit of the polyester polymer (I).

It is necessary that the polyester polymer (I) to be used in Invention 2 has a limiting viscosity of from 0.15 to 0.40 dl/g. The limiting viscosity is preferably from 0.20 to 0.35 dl/g. When the limiting viscosity of the polyester polymer (I) is less than 0.15 dl/g, anti-blocking property of the powder coating composition tends to be lowered. When exceeding 0.40 dl/g, pulverizability of the resin tends to be lowered.

It is desirable that the polyester polymer (I) to be used in Invention 2 has a hydroxyl value of from 14 to 100 mgKOH/g, preferably 25 to 60 mgKOH/g or an acid value of from 15 to 50 mgKOH/g. When the hydroxyl value is less than 14 mgKOH/g or the acid value is less than 15 mgKOH/g, there is a tendency that there arise a large unevenness on a surface of a coating film and smoothness is lowered. When the hydroxyl value exceeds 100 mgKOH/g, a mechanical strength of the coating film tends to be lowered. Or when the acid value exceeds 50 mgKOH/g, an adding amount of the epoxy resin curing agent must be increased and thereby weather resistance of the coating film tends to be lowered.

The polyester polymer (I) of Invention 2 can be prepared by the method of carrying out esterification or transesterification of the above-mentioned polybasic acid component and polyol component (including ester-forming derivative thereof) as starting materials at a temperature of from 200° to 280° C. by usual method and then carrying out a polycondensation reaction under reduced pressure of not more than 5 hPa at a temperature of 200° to 300° C., preferably 230° to 290° C. until a specific limiting viscosity is reached, thereby giving a polyester polymer having a high polymerization degree. Subsequently to the polyester polymer is added an alcohol component or carboxylic acid component, and a depolymerization reaction is carried out at a temperature of from 180° to 300° C., preferably 220° to 280° C. until a specific limiting viscosity and hydroxyl value or acid value are obtained. Thus the polyester polymer (I) can be prepared.

Also the polyester polymer (I) can be prepared by carrying out esterification or transesterification by usual method and then carrying out a polycondensation reaction under atmospheric pressure or under reduced pressure of from about 50 hPa to about 100 hPa at a temperature of from 200° to 300° C., preferably 230° to 290° C. until a specific limiting viscosity and hydroxyl value or acid value are obtained.

Examples of the polybasic acid component to be used for the above-mentioned depolymerization reaction are dicarboxylic acids such as isophthalic acid, phthalic acid and phthalic anhydride and polycarboxylic acids having three or more functional groups such as trimellitic acid, trimellitic anhydride and pyromellitic acid.

Also in the esterification, transesterification and polycondensation reaction, known reactive catalysts, and the like can be used.

Examples of preferable thermosetting polyester polymer (I) are, for instance, a copolycondensation product of isophthalic acid and neopentyl glycol, a copolycondensation product of isophthalic acid, terephthalic acid and neopentyl glycol, a copolycondensation product of isophthalic acid, terephthalic acid, neopentyl glycol and ethylene glycol, a copolycondensation product of 1,4-cyclohexane dicarboxylic acid and neopentyl glycol, a copolycondensation product of 1,4-cyclohexane dicarboxylic acid, terephthalic acid and neopentyl glycol, a copolycondensation product of 1,4-cyclohexane dicarboxylic acid, terephthalic acid, neopentyl glycol and ethylene glycohol, and the like. Among them, particularly from the viewpoint of excellent weather resistance and good compatibility with the fluorine-containing polymer (II), the copolycondensation product of isophthalic acid, terephthalic acid and neopentyl glycol and the copolycondensation product of 1,4-cyclohexane dicarboxylic acid, terephthalic acid and neopentyl glycol are preferable.

Examples of the fluorine-containing polymer (II) to be mixed to the thermosetting polyester polymer (I) are known polymers, for instance, those described in JP-B-6-104792, JP-A-6-345822, JP-A-6-184243, etc.

Examples thereof are, for instance, polymers comprising a fluoroolefin unit as an essential component and obtained by copolymerizing a compound having an unsaturated bond copolymerizable with the fluoroolefin. Examples of the fluoroolefin are, for instance, tetrafluoroethylene, monofluoroethylene, trifluoroethylene, vinylidene fluoride, hexafluoropropylene, pentafluoropropylene, chlorotrifluoroethylene, and the like. The fluoroolefin can be optionally selected depending on characteristics required for the coating film and a combination with other copolymer component or a curing agent. Also two or more of those fluoroolefins can be used. From the viewpoint of copolymerizability and weather resistance, particularly preferable fluoroolefins are perfluoroolefins such as tetrafluoroethylene and hexafluoropropylene and chlorotrifluoroethylene.

In Invention 2, from the viewpoint of compatibility with the polyester polymer and weather resistance, it is preferable to use the thermosetting fluorine-containing polymer (IIa) having a crosslinkable reactive group as the fluorine-containing polymer (II). Examples of the crosslinkable reactive group contained in the thermosetting fluorine-containing polymer are hydroxyl group, carboxyl group, amido group, amino group, mercapto group, glycidyl group, isocyanate group, and the like. Examples of a method for introducing such a crosslinkable reactive group into the copolymer are a method of copolymerizing a monomer having a crosslinkable reactive group, a method of decomposing a part of the copolymer, a method of reacting a reactive group of the copolymer with a compound giving a crosslinkable reactive group thereto, and the like.

Examples of the comonomer which can introduce a suitable crosslinkable reactive group by copolymerization are, for instance, monomers having hydroxyl group or a group which can be converted to hydroxyl group and having a double bond being copolymerizable with the fluoroolefin. Examples thereof are one or two or more of hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; esters of vinyl alcohol and hydroxyalkylcarboxylic acid such as vinyl hydroxyacetate, vinyl hydroxypropionate, vinyl hydroxybutyrate, vinyl hydroxyvalerate, vinyl hydroxyisobutyrate and vinyl hydroxycyclohexanecarboxylate; hydroxyalkyl allyl ethers such as hydroxyethyl allyl ether, hydroxypropyl allyl ether, hydroxybutyl allyl ether, hydroxyisobutyl allyl ether and hydroxycyclohexyl allyl ether; hydroxyalkyl allyl esters such as hydroxyethyl allyl ester, hydroxypropyl allyl ester, hydroxybutyl allyl ester, hydroxyisobutyl allyl ester and hydroxycyclohexyl allyl ester; hydroxyalkyl esters of acrylic acid or methacrylic acid such as 2-hydroxyethyl acrylate, hydroxypropyl acrylate, 2-hydroxyethyl methacrylate and hydroxypropyl methacrylate; partly fluorine-substituted compounds thereof; and the like. One or two or more thereof may be selected and used as a comonomer for introducing hydroxyl group.

Examples of the comonomer having carboxyl group are, for instance, α,β-unsaturated carboxylic acids such as acrylic acid, methacrylic acid, itaconic acid, fumaric acid, fumaric anhydride, crotonic acid, maleic acid, maleic anhydride and undecylenic acid and in addition, carboxyl alkyl allyl ether such as allyloxy propionic acid, fluorine-substituted monomer such as perfluorobutenoic acid, and the like. Also examples of the comonomer having glycidyl group are, for instance, glycidyl (meth)acrylate, glycidyl vinyl ether, glycidyl allyl ether, and the like. Examples of the comonomer having amino group are, for instance, amino alkyl vinyl ether, amino alkyl allyl ether, and the like. Examples of the comonomer having amido group are, for instance, (meth)acrylamide, methylolacrylamide, and the like. Examples of the comonomer having nitrile group are, for instance, (meth)acrylonitrile, and the like. Examples of the comonomer having isocyanate group are, for instance, vinyl isocyanate, isocyanate ethyl acrylate, and the like. Examples of the comonomer having an activated halogen group are, for instance, vinyl chloride, vinylidene chloride, and the like.

It is preferable to use particularly a vinyl or allyl ether or ester compound as a comonomer for introducing a crosslinkable reactive group from the viewpoint of excellent copolymerizability with the fluoroolefin.

Example of the method for partly decomposing the copolymer is a method of copolymerizing a monomer having a hydrolyzable ester group after polymerization and then hydrolyzing the copolymer to generate a carboxyl group in the copolymer. Also it is possible to form crosslinkage directly by transesterification in a curing reaction without carrying out ester hydrolysis mentioned above.

As the method for reacting the copolymer with a compound giving a crosslinkable reactive group thereto, for example, a method of introducing carboxyl group by reacting a divalent carboxylic acid anhydride such as succinic anhydride with a fluorine-containing copolymer having hydroxyl group can be employed suitably.

In addition to the above-mentioned fluoroolefin unit and the unit having a crosslinkable reactive group, a comonomer copolymerizable with those two components can be copolymerized in the thermosetting fluorine-containing polymer (IIa) to be used in Invention 2, in order to reduce a melting point or a glass transition temperature of the fluorine-containing polymer for further enhancing workability at coating and imparting physical properties such as proper hardness, flexibility and gloss to the coating film. Example of such an optional comonomer is one which has an unsaturated group being active to an extent of being able to be copolymerized with the fluoroolefin and does not lower weather resistance of the coating film remarkably.

Suitable examples of such an optional comonomer are ethylenically unsaturated compounds, for instance, alkyl vinyl ethers such as ethyl vinyl ether, propyl vinyl ether, butyl vinyl ether, isobutyl vinyl ether and cyclohexyl vinyl ether; esters of vinyl alcohol and alkylcarboxylic acid such as vinyl acetate, vinyl propionate, vinyl butyrate, vinyl isobutyrate, vinyl valerate and vinyl cyclohexanecarboxylate; alkyl allyl ethers such as ethyl allyl ether, propyl allyl ether, butyl allyl ether, isobutyl allyl ether and cyclohexyl allyl ether; alkyl allyl esters such as ethyl allyl ester, propyl allyl ester, butyl allyl ester, isobutyl allyl ester and cyclohexyl allyl ester; alkenes such as ethylene, propylene, butylene and isobutylene; acrylic acid and methacrylic acid; esters of acrylic acid or methacrylic acid such as ethyl acrylate, propyl acrylate, butyl acrylate, isobutyl acrylate, 2-ethylhexyl acrylate, ethyl methacrylate, propyl methacrylate, butyl methacrylate, isobutyl methacrylate and 2-ethylhexyl methacrylate; partly fluorine-substituted compounds thereof; and the like. Those optional comonomers may be used solely or in combination of two or more thereof.

Among them, vinyl or allyl compounds or alkenes being excellent in copolymerizability with the fluoroolefin are used preferably as the optional comonomer. In case of using vinyl or allyl alkyl esters or alkyl ethers, a linear, branched or alicyclic alkyl group having about 2 to about 10 carbon atoms can be preferably used as an alkyl group.

From the above-mentioned point of view, examples of the thermosetting fluorine-containing polymer are, for instance, tetrafluoroethylene/cyclohexyl vinyl ether/isobutyl vinyl ether/hydroxybutyl vinyl ether copolymer, tetrafluoroethylene/isobutylene/hydroxybutyl vinyl ether copolymer, tetrafluoroethylene/hexafluoropropylene/ethylene/hydroxybutyl vinyl ether copolymer, tetrafluoroethylene/hexafluoropropylene/ethylene/hydroxybutyl vinyl ether/vinyl benzoate copolymer, vinylidene fluoride/tetrafluoroethylene/perfluorobutenoic acid copolymer, chlorotrifluoroethylene/cyclohexyl vinyl ether/vinyl versatate/hydroxybutyl vinyl ether copolymer, chlorotrifluoroethylene/cyclohexyl vinyl ether/vinyl benzoate/hydroxybutyl vinyl ether copolymer, tetrafluoroethylene/cyclohexyl vinyl ether/vinyl versatate/hydroxybutyl vinyl ether copolymer, chlorotrifluoroethylene/cyclohexyl vinyl ether/hydroxybutyl vinyl ether/ethyl vinyl ether copolymer, and the like.

Examples of the thermosetting fluorine-containing polymer (IIa) which can be used particularly suitably in Invention 2 are copolymers comprising a perfluoroolefin such as tetrafluoroethylene or hexafluoropropylene and a vinyl ether and/or vinyl ester as the essential components. When such a resin is used, from the viewpoint of excellent adhesion and moisture permeability thereof, there can be obtained a higher effect of preventing rust of metallic substrate.

It is desirable that the thermosetting fluorine-containing polymer (IIa) to be used for the thermosetting powder coating composition of Invention 2 has a fluorine content of not less than 10% by weight. When the fluorine content is less than 10% by weight, a coating film having a sufficient weather resistance cannot be obtained.

Also it is desirable that a MFR of the thermosetting fluorine-containing polymer (IIa) is within a range of from 0.1 to 100 g/10 min when measured at 100° to 180° C. When the MFR measured at 100° C. of a low temperature side is less than 0.1 g/10 min, meltability of the resin at kneading with other additives such as a pigment is not sufficient, and color developing property, weather resistance and impact resistance of the obtained coating film are inferior. When the MFR measured at 180° C. of a high temperature side is larger than 100 g/10 min, a viscosity of the resin at melt-kneading is lowered and the melt-kneading is not sufficient, and thus color developing property, weather resistance and impact resistance of the obtained coating film are also inferior.

Further it is desirable that the thermosetting fluorine-containing polymer (IIa) has a glass transition temperature of from 30° to 120° C. When the glass transition temperature is not more than 30° C., storage stability of the obtained coating composition is not sufficient. When exceeding 120° C., melt-kneading property is lowered, thereby making it impossible to sufficiently disperse other additive such as a pigment at the melt-kneading step.

The resin components of the thermosetting powder coating composition of Invention 2 comprise one or two or more of the thermosetting polyester polymers (I) and one or two or more of the fluorine-containing polymers (II). A mixing ratio (I)/(II) of the polymer (I) to the polymer (II) can be selected in a wide range of from 99/1 to 1/99 in a weight ratio. From the viewpoint of improving weather resistance of the polyester polymer (I), the mixing ratio is preferably from 50/50 to 1/99. If the proportion of the fluorine-containing polymer (II) decreases, an effect of enhancing weather resistance is lowered. If the proportion of the fluorine-containing polymer (II) increases, there is a tendency that an appearance such as smoothness and gloss and flexibility of the coating film are lowered and workability at coating is lowered. In case where physical properties (for example, flexibility) of the coating film are intended to be improved by the polyester polymer (I), the mixing ratio (I)/(II) of the polymer (I) to the polymer (II) may be from 99/1 to 50/50. Further in case where the above-mentioned fluorine-containing polymer (A) is used, even when the ratio is in a range of from 75/25 to 50/50, a coating film having properly balanced weather resistance and appearance can be obtained.

The thermosetting powder coating compositions of Invention 1 and Invention 2 can be prepared by blending a curing agent to the above-mentioned resin components.

As a curing agent, those which have been used for thermosetting polyester resin powder coating composition and/or thermosetting fluorine-containing resin powder coating composition can be used. Examples thereof are, for instance, blocked isocyanate compound, acid anhydrides, polyamine compounds, glycidyl compounds, isocyanurate compounds, polybasic acids, and the like. An adding amount thereof is one corresponding to an amount of the crosslinkable reactive group of the polymer, preferably 0.8 to 1.2 equivalents.

In addition, various additives which are usually used for a powder coating, for example, a pigment, filler, ultraviolet ray absorber, leveling agent, flowability control agent, antioxidant, heat deterioration preventing agent, gloss control agent, electric charge control agent, foaming preventing agent, and the like may be blended optionally. Among such third components, it is preferable to use those containing no chlorine.

Examples of the pigment are, for instance, one or two or more of inorganic pigments such as titanium dioxide, iron oxide red, yellow iron oxide and carbon black; organic pigments such as phthalocyanine blue, phthalocyanine green, quinacridone red pigment and isoindolenone yellow pigment; extender pigments such as talc, silica and calcium carbonate; metal powders such as aluminum powder and stainless steel powder; mica powder; and the like. Also it is preferable that a rust inhibiting pigment represented by pyrophosphoric acid or tripolyphosphate is blended.

The thermosetting powder coating composition can be prepared in the same manner as in the known methods for preparing thermosetting powder coating compositions by dry-blending each component, melt-kneading and then pulverizing. As case demands, the third components to be added may be previously blended to the resin component or curing agent. An average particle size of the powder coating composition is usually not more than 400 $\mu$m.

Examples of a substrate to be coated are a metallic substrate, plastic substrate, rubber substrate, ceramic substrate, substrate made of natural material, and the like. Examples of the metallic substrate are substrates of iron, aluminum, stainless steel, copper, zinc or alloys thereof, for instance, stainless steel and brass.

The coating can be carried out, for example, with a commercially available electrostatic coating machine or fluidized bed coating machine. After coating uniformly, a coating film is formed by baking with a hot air oven, infrared ray oven, induction heater, or the like.

Invention 1 and Invention 2 are then explained by means of examples and preparation examples, but the present invention is not limited to them.

PREPARATION EXAMPLES 1 TO 6

(Synthesis of Thermosetting Polyester Polymer)

An esterification reactor was charged with starting compounds in amounts (part by mole) shown in Table 1, and esterification was carried out at a pressure of from 0.05 to 0.25 MPaG at 200° to 260° C. for four hours. After the obtained esterified product was transferred into a polycondensation reactor, antimony trioxide was added thereto in an amount of $4 \times 10^{-4}$ mole per 1 mole of acid component and a pressure inside the reactor was decreased to 0.4 hPa, followed by polycondensation reaction at 280° C. for three hours. Thus a polyester resin having a limiting viscosity of 0.45 dl/g was obtained. Then to the polyester resin was added a depolymerization agent in an amount (part by mole) shown in Table 1, and a depolymerization reaction was carried out at 270° C. at atmospheric pressure for one hour to give a polyester resin having characteristic values shown in Table 1. Characteristic values of the polyester polymers were obtained by the following methods.

(a) Limiting viscosity: Measurement was made at 20° C. by using a solvent comprising a mixture of phenol and tetrachloroehtane in an equivalent weight.

(b) Hydroxyl value: After acetylation of the resin with acetic anhydride, a hydroxyl value was obtained by titration with a methanol solution of potassium hydroxide.

(c) Acid value: After 0.5 g of the resin was dissolved in 50 ml of a solvent comprising a mixture of dioxane/diluted water=10/1 (in weight ratio) and reflux by heating was carried out, an acid value was obtained by titration with a 0.1 N methanol solution of potassium hydroxide.

(d) Softening temperature: The resin pulverized into a size of 60 to 100 mesh was put in a glass tube of 2.5 mm diameter×150 mm length having a bottom in an amount up to a height of 30 mm from the bottom and the resin-filled part of the tube was dipped in an oil bath, followed by heating at a rate of 1° C./min. A temperature where the resin begins to be liquefied is determined with naked eyes to give a softening temperature.

Abbreviations in Table 1 represent the following compounds.

IPA: Isophthalic acid
CHDA: 1,4-Cyclohexane dicarboxylic acid
TPA: Terephthalic acid
NPG: Neopentyl glycol
EG: Ethylene glycol
TMP: Trimethylolpropane
GC: Glycerine
TMA: Trimellitic acid

TABLE 1

| Polyester | Preparation Example | | | | | |
|---|---|---|---|---|---|---|
| polymer | 1 | 2 | 3 | 4 | 5 | 6 |
| Starting compound | | | | | | |
| IPM | 80 | | 60 | | 80 | |
| CHDA | | 80 | | | | |
| TPA | 20 | 20 | 40 | 100 | 20 | 100 |
| NPG | 145 | 145 | | | 135 | |
| EG | | | 145 | 145 | | 135 |
| Depolymerization agent | | | | | | |
| TMP | 2 | 2 | | 3 | | |
| GC | | | 3 | 2 | | |
| NPG | 2 | 2 | | | | |
| IPA | | | | | 4 | |
| TMA | | | | | 4 | 4 |
| Characteristics of resin | | | | | | |
| Limiting viscosity (dl/g) | 0.28 | 0.31 | 0.33 | 0.29 | 0.21 | 0.29 |
| Hydroxyl value (mgKOH/g) | 24 | 25 | 22 | 30 | | |
| Acid value (mgKOH/g) | | | | | 47 | 34 |
| Softening temperature (° C.) | 79 | 80 | 80 | 82 | 78 | 83 |
| Abbreviation of polyester polymer | I-1 | I-2 | I-3 | I-4 | I-5 | I-6 |

PREPARATION EXAMPLE 7
(Preparation of Thermosetting Fluorine-Containing Polymer)

A 300-ml pressure resistant stainless steel reactor with a stirrer was charged with 157 g of t-butanol, 28 g of cyclohexyl vinyl ether (c-HxVE), 11 g of VeoVa9 (vinyl versatate available from Shell Chemical Co., Ltd.), 11 g of 4-hydroxybutyl vinyl ether (HBVE), 1 g of potassium carbonate and 0.07 g of azobisisobutyronitrile (AIBN), and dissolved air was removed by solid deaeration with liquid nitrogen. Then 50 g of chlorotrifluoroethylene (CTFE) was introduced, and the reactor temperature was slowly increased. A reaction was continued with stirring while maintaining the temperature at 65° C. Ten hours after, the reactor was cooled with water and the reaction was stopped. After cooling to room temperature, un-reacted monomer was released and the reaction was terminated. Then the reactor was heated up to 60° C., and a dispersing medium was removed under reduced pressure of 1 mmHg over 24 hours to give a thermosetting fluorine-containing copolymer (II-1). The obtained fluorine-containing copolymer was a copolymer of chlorotrifluoroethylene/cyclohexyl vinyl ether/VeoVa9/4-hydroxybutyl vinyl ether which were nearly the same components as the starting monomers. A glass transition temperature of the copolymer was 48° C., a melt viscosity MFR measured at 140° C. was 10 g/10 min, and a hydroxyl value was 54 mgKOH/g.

The thermosetting fluorine-containing polymer (II-1) was pulverized with an impact hammer mill to be formed into a powder.

PREPARATION EXAMPLES 8 TO 9

Thermosetting fluorine-containing polymers shown in Table 2 were prepared in the same manner as in Preparation Example 7 except that monomer mixtures shown in Table 2 were used and amounts of a solvent (t-butanol) and polymerization initiator (AIBN) were changed optionally.

The obtained thermosetting fluorine-containing polymers were pulverized with an impact hammer mill to be formed into a powder.

PREPARATION EXAMPLE 10

After a 4,000-ml stainless steel autoclave was charged with 760 g of deionized water and 7.6 g of potassium carbonate, increasing of a pressure inside the autoclave with nitrogen and desiring were repeated three times to remove dissolved oxygen. Then the autoclave was charged with 580 g of chlorofluoroethane (HCFC141b), 340 g of hexafluoropropene (HFP), 3.1 g of HBVE and 2.1 g of vinyl benzoate (VBz) under reduced pressure, and a temperature inside the autoclave was adjusted to 35° C. Further the pressure was adjusted to become 0.96 MPa with a monomer mixture of tetrafluoroethylene (TFE)/ethylene (Et) in a % by mole ratio of 82/18. Then 23 g of 25% isobutyryl peroxide solution of flon 225 was introduced to initiate a reaction. Since the pressure lowered with advance of the reaction, a monomer mixture of TFE/Et/HFP in a % by mole ratio of 45/39/16 was supplied continuously to maintain the pressure inside the autoclave at 0.96 MPa. The reaction was carried out for eight hours while continuously supplying 15.8 g of HBVE and 11.3 g of VBz and adding 12 g of 25% isobutyryl peroxide solution of flon 225 every six hours. Then the temperature and pressure inside the autoclave were lowered to ordinary temperature and atmospheric pressure to terminate the reaction. The obtained solid was washed and dried to give 126 g of a white powder of fluorine-containing copolymer (II-4). The obtained fluorine-containing copolymer was a copolymer comprising TFE/HFP/Et/VBz/HBVE (41/24/14/10/11% by weight). A glass transition temperature thereof was 40° C., a melt viscosity MFR measured at 140° C. was 120 g/10 min, and a hydroxyl value was 53 mgKOH/g.

The obtained fluorine-containing copolymer was pulverized with an impact hammer mill.

PREPARATION EXAMPLE 11

A fluorine-containing polymer was prepared in the same manner as in Preparation Example 7 except that the monomer mixture shown in Table 2 was used. 100 Parts of the obtained polymer was dissolved in 100 parts of xylene, and 5.0 parts of succinic anhydride and 0.05 part of triethylbenzyl ammonium chloride were added thereto. The mixture was heated to 100° C. in a four-neck flask provided with a stirrer and reacted with stirring for three hours, followed by cooling to terminate the reaction. Then the mixture was heated to 60° C. and the solvent was removed under reduced pressure of 1 mmHg over 24 hours to give a thermosetting fluorine-containing copolymer (II-5) having carboxyl group.

The obtained thermosetting fluorine-containing polymer was pulverized with an impact hammer mill to be formed into a powder.

Abbreviations in Table 2 represent the following compounds.
CTFE: Chlorotrifluoroethylene
TFE: Tetrafluoroethylene
HFP: Hexafluoropropylene
Et: Ethylene
c-HxVE: Cyclohexyl vinyl ether
Veova9: Vinyl versatate available from Shell Chemical Co., Ltd.
VBz: Vinyl benzoate
HBVE: 4-Hydroxybutyl vinyl ether
EVE: Ethyl vinyl ether

TABLE 2

| Fluorine-containing polymer | Preparation Example | | | | |
|---|---|---|---|---|---|
| | 7 | 8 | 9 | 10 | 11 |
| Monomer components (% by weight) | | | | | |
| CTFE | 50 | 51 | 50 | — | 50 |
| TFE | — | — | — | 41 | — |
| HFP | — | — | — | 24 | — |
| Et | — | — | — | 14 | — |
| c-HxVE | 28 | 25 | 28 | — | 25 |
| Veova9 | 11 | — | — | — | — |
| VBz | — | 10 | — | 10 | 5 |
| HBVE | 11 | 14 | 11 | 11 | 20 |
| EVE | — | — | 11 | — | — |
| Total | 100 | 100 | 100 | 100 | 100 |
| Physical properties of polymer | | | | | |
| Hydroxyl value (mgKOH/g) | 54 | 68 | 54 | 53 | 46.9 |
| Acid value (mgKOH/g) | — | — | — | — | 26.7 |
| Glass transition temperature (° C.) | 48 | 45 | 45 | 40 | 42 |
| MFR (g/10 min) | 10 | 55 | 9 | 120 | 20 |
| Abbreviation of fluorine-containing polymer | II-1 | II-2 | II-3 | II-4 | II-5 |

EXAMPLE 1

41.8 Parts of the thermosetting polyester polymer powder (I-1) prepared in Preparation Example 1, 17.9 parts of the thermosetting fluorine-containing polymer (II-1) prepared in Preparation Example 7, 9.8 parts of a curing agent (ε-caprolactam-blocked isocyanate, B-1530 available from Hüls Co., Ltd.), 30 parts of a pigment (titanium dioxide) and 0.5 part of a leveling agent (MODAFLOW available from Monsanto Chemical Co., Ltd.) were dry-blended in Henschel mixer (available from Mitsui Kakoki Kabushiki Kaisha) for one minute. Then the mixture was melt-kneaded at 100° C. with an extrusion kneader (Buss Co-kneader PR-46 available from Buss Co., Ltd.), and after cooled, pulverized with an impact hammer mill. The obtained powder was classified with a 150 mesh screen to give a thermosetting polyester resin powder coating composition.

The powder coating composition was coated on a 150× 75×1 mm steel plate subjected to zinc phosphate treatment (thickness: 0.8 mm) by using a corona discharge type powder coating gun (GX3300 available from Onoda Cement Kabushiki Kaisha) at an applied voltage of 40 kV, and then baking was carried out at 190° C. for 20 minutes to give a coated plate for testing. The following tests were carried out by using the coated plate. The results are shown in Table 3.

Thickness of Cured Coating Film:

A thickness was measured with an eddy-current instrument EL10D for measuring thickness (available from Kabushiki Kaisha Sanko Denshi Kenkyusho).

Appearance of Coating Film:

When light of fluorescent lamp is reflected on a coating film, a shape of light reflected on a surface of the coating film is evaluated with naked eyes.
A: No distortion.
B: Slight distortion.
C: Apparent distortion.
D: Large distortion.

Gloss:

A specular reflectivity at an angle of 60 degrees is measured according to JIS K 5400 6.7.60.

Weather Resistance:

After an accelerated weather resistance test is carried out for 2,000 hours with I-SUPER UV tester Model W-13 (Light/Dew/Rest=11/11/1 HR is assumed to be one cycle) available from Iwasaki Electric Co., Ltd. according to JIS K5400 9.8.1, a gloss retention (a ratio of gloss after the test to initial gloss) is measured.

Flexibility:

A bending test is carried out according to AAMA605.

Adhesive Property:

A coated plate is dipped in boiling water for two hours, and then adhesive property is evaluated by a cross-cut test according to JIS K5400 8.5.1.

Pulverizability:

After the pulverization, a proportion of particles having a particle size of not less than 400 μm based on the total particles is measured, and pulverizability is evaluated by the following criteria.
A: 0%
B: <1%
C: 1 to 10%
D: >10%

Anti-Blocking Property:

15 Grams of the powder coating composition is put in a test tube of 40 mm diameter and allowed to stand at 35° C. for 240 hours while applying a load of 20 g/cm² thereon. Then the powder is taken out and a flowability and a state of blocking thereof are evaluated by the following criteria.
A: No blocking is recognized at all, and there is no change in flowability.
B: A flowability is lowered slightly.
C: Blocking is partly recognized.
D: Powder is wholly formed into a mass.

EXAMPLES 2 TO 12

Thermosetting powder coating compositions comprising components shown in Table 3 were prepared and coated in the same manner as in Example 1, and various tests were carried out. The results are shown in Table 3.

TGIC in Tables 3, 4 and 5 represents triglycidyl isocyanurate.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Components of powder coating composition (part by weight) | | | | | | | | | | | | |
| Fluorine-containing polymer (A) | | | | | | | | | | | | |
| II-1 | 17.9 | 34.5 | | | | | 17.6 | 34.1 | | | | |
| II-2 | | | 17.6 | 33.3 | | | | | | | | |
| II-4 | | | | | 17.9 | 34.6 | | | | | | |
| II-5 | | | | | | | | | 19.4 | 39.2 | 19.7 | 39.5 |
| Polyester polymer (B) | | | | | | | | | | | | |
| I-1 | 41.8 | 23.0 | 41.0 | 22.2 | 41.8 | 23.0 | | | | | | |
| I-4 | | | | | | | 41.0 | 22.8 | | | | |
| I-5 | | | | | | | | | 45.2 | 26.1 | | |
| I-6 | | | | | | | | | | | 45.9 | 26.4 |
| Curing agent | | | | | | | | | | | | |
| B1530 | 9.8 | 12.0 | 10.0 | 12.1 | 9.5 | 11.9 | 10.9 | 12.6 | | | | |
| TGIC | | | | | | | | | 4.9 | 4.2 | 3.9 | 3.6 |
| Pigment | 30 | 30 | 30 | 30 | 30 | 30 | 30 | 30 | 30 | 30 | 30 | 30 |
| Leveling agent | 0.5 | 0.5 | 0.5 | 0.5 | 0.5 | 0.5 | 0.5 | 0.5 | 0.5 | 0.5 | 0.5 | 0.5 |
| (A)/(B) | 30/70 | 60/40 | 30/70 | 60/40 | 30/70 | 60/40 | 30/70 | 60/40 | 30/70 | 60/40 | 30/70 | 60/40 |
| Physical properties of coating film | | | | | | | | | | | | |
| Coating thickness (μm) | 40 | 40 | 40 | 40 | 40 | 40 | 40 | 40 | 40 | 40 | 40 | 40 |
| Appearance of coating film | A | B | A | B | A | B | A | B | A | B | A | B |
| Gloss | 88 | 80 | 89 | 77 | 85 | 76 | 88 | 78 | 88 | 79 | 89 | 79 |
| Weather resistance | 80% | 90% | 82% | 89% | 80% | 87% | 60% | 71% | 78% | 87% | 60% | 71% |
| Flexibility | 1T | 1T | 1T | 1T | 1T | 1T | 1T | 1T | 1T | 1T | 1T | 1T |
| Adhesive property | 100/100 | 100/100 | 100/100 | 100/100 | 100/100 | 100/100 | 100/100 | 100/100 | 100/100 | 100/100 | 100/100 | 100/100 |
| Pulverizability | A | B | A | B | A | B | A | B | A | B | A | B |
| Anti-blocking property | A | A | A | A | A | A | A | A | A | A | A | A |

EXAMPLES 13 TO 18

Thermosetting powder coating compositions-comprising components shown in Table 4 were prepared and coated in the same manner as in Example 1, and various tests were carried out. The results are shown in Table 4. In Table 4, the results of Examples 1, 2, 9 and 10 are shown together.

TABLE 4

|  | Ex. 1 | Ex. 2 | Ex. 13 | Ex. 14 | Ex. 15 | Ex. 16 | Ex. 17 | Ex. 18 | Ex. 9 | Ex. 10 |
|---|---|---|---|---|---|---|---|---|---|---|
| Components of powder coating composition (part by weight) | | | | | | | | | | |
| Polyester polymer (I) | | | | | | | | | | |
| I-1 | 41.8 | 23.0 | | | | | 41.8 | 23.0 | | |
| I-2 | | | 41.6 | 22.9 | | | | | | |
| I-3 | | | | | 42.0 | 23.0 | | | | |
| I-5 | | | | | | | | | 45.2 | 26.1 |
| Fluorine-containing polymer (II) | | | | | | | | | | |
| II-1 | 17.9 | 34.5 | 17.9 | 34.5 | 18.0 | 34.6 | | | | |
| II-3 | | | | | | | 17.9 | 34.5 | | |
| II-5 | | | | | | | | | 19.4 | 39.2 |
| Curing agent | | | | | | | | | | |
| B1530 | 9.8 | 12.0 | 10.0 | 12.1 | 9.5 | 11.9 | 9.8 | 12.0 | | |
| TGIC | | | | | | | | | 4.9 | 4.2 |
| Pigment | 30 | 30 | 30 | 30 | 30 | 30 | 30 | 30 | 30 | 30 |
| Leveling agent | 0.5 | 0.5 | 0.5 | 0.5 | 0.5 | 0.5 | 0.5 | 0.5 | 0.5 | 0.5 |
| (I)/(II) | 70/30 | 40/60 | 70/30 | 40/60 | 70/30 | 40/60 | 70/30 | 40/60 | 70/30 | 40/60 |
| Physical properties of coating film | | | | | | | | | | |
| Coating thickness (μm) | 40 | 40 | 40 | 40 | 40 | 40 | 40 | 40 | 40 | 40 |
| Appearance of coating film | A | B | A | B | A | B | B | C | A | B |
| Gloss | 88 | 80 | 89 | 81 | 89 | 79 | 70 | 68 | 88 | 79 |
| Weather resistance | 80% | 90% | 79% | 88% | 75% | 80% | 65% | 75% | 78% | 87% |
| Flexibility | 1T | 1T | 1T | 1T | 1T | 1T | 1T | 1T | 1T | 1T |
| Adhesive property | 100/100 | 100/100 | 100/100 | 100/100 | 100/100 | 100/100 | 100/100 | 100/100 | 100/100 | 100/100 |

TABLE 4-continued

|  | Ex. 1 | Ex. 2 | Ex. 13 | Ex. 14 | Ex. 15 | Ex. 16 | Ex. 17 | Ex. 18 | Ex. 9 | Ex. 10 |
|---|---|---|---|---|---|---|---|---|---|---|
| Pulverizability | A | B | A | B | A | B | A | B | A | B |
| Anti-blocking property | A | A | A | A | A | A | B | B | A | A |

COMPARATIVE EXAMPLES 1 TO 5

Thermosetting powder coating compositions for comparison comprising components shown in Table 5 were prepared and coated in the same manner as in Example 1, and various tests were carried out. The results are shown in Table 5.

TABLE 5

|  | Com. Ex. 1 | Com. Ex. 2 | Com. Ex. 3 | Com. Ex. 4 | Com. Ex. 5 |
|---|---|---|---|---|---|
| Components of powder coating composition (part by weight) | | | | | |
| Polyester polymer (A) | | | | | |
| I-1 | 62.1 | | | | |
| I-3 | | 61.8 | | | |
| I-4 | | | | | 22.7 |
| I-5 | | | 63.9 | | |
| Fluorine-containing polymer (B) | | | | | |
| II-1 | | | | 54.7 | |
| II-3 | | | | | 34.2 |
| Curing agent | | | | | |
| B1530 | 7.4 | 7.7 | | 14.8 | 12.6 |
| TGIC | | | 5.6 | | |
| Pigment | 30 | 30 | 30 | 30 | 30 |
| Leveling agent | 0.5 | 0.5 | 0.5 | 0.5 | 0.5 |
| (I)/(II) | 100/0 | 100/0 | 100/0 | 0/100 | 40/60 |
| Physical properties of coating film | | | | | |
| Coating thickness (μm) | 40 | 40 | 40 | 40 | 40 |
| Appearance of coating film | A | A | A | D | D |
| Gloss | 90 | 91 | 90 | 65 | 63 |
| Weather resistance | 40% | 31% | 32% | 98% | 48% |
| Flexibility | 3T | 3T | 3T | 1T | 2T |
| Adhesive property | 100/100 | 100/100 | 100/100 | 0/100 | 100/100 |
| Pulverizability | A | A | A | D | D |
| Anti-blocking property | A | A | A | C | B |

From the results of Tables 3 to 5, it is seen that the following effects are exhibited.

First when the specific polyester polymer to be used in Invention 2 is used solely (Comparative Examples 1 to 3), weather resistance and flexibility are inferior though an appearance of a coating film is excellent. Also when the specific fluorine-containing polymer comprising a vinyl ester unit which is used in Invention 1 is used solely (Comparative Example 4), though weather resistance is very excellent, adhesive property and storage stability of a powder as well as an appearance of a coating film are inferior. Further in case of a combination use of a fluorine-containing polymer comprising no vinyl ester unit and a general purpose polyester polymer (Comparative Example 5), storage stability is improved, but an appearance of a coating film is inferior and weather resistance is not improved.

On the other hand, in case of a combination use of the specific fluorine-containing polymer (A) to be used in Invention 1 and the polyester polymer (B) (Examples 1 to 12), even when a general purpose polyester polymer is used as the polyester polymer (B) (Examples 7, 8, 11 and 12) weather resistance is improved and an appearance of a coating film is excellent. Further when the specific polyester polymer (1) to be used in Invention 2 is used as the polyester polymer (B) (Examples 1 to 6, 9 and 10), weather resistance and an appearance of a coating film are very excellent and well-balanced.

Also in case of a combination use of the specific polyester polymer (I) to be used in Invention 2 and the fluorine-containing polymer (II), when the specific fluorine-containing polymer (A) comprising a vinyl ester unit which is used in Invention 1 is used as the fluorine-containing polymer (II), (Examples 13 to 16 and Examples 1, 2, 9 and 10), weather resistance and an appearance of a coating film are very excellent and well-balanced. Even when the specific fluorine-containing polymer (A) is not used (Examples 17 and 18), both of weather resistance and an appearance of a coating film and further pulverizability are excellent as compared with Comparative Example 5 in which the specific polyester polymer (I) is not used.

INDUSTRIAL APPLICABILITY

According to the present invention, weather resistance and an appearance of a coating film, for example, gloss and smoothness which are conflicting properties in the thermosetting powder coating composition can be enhanced and well balanced.

What is claimed is:

1. A thermosetting powder coating composition which comprises a fluorine-containing polymer (A) comprising a fluoroolefin unit and vinyl versatate unit and/or vinyl benzoate unit as essential components and having a crosslinkable reactive group, a polyester polymer (B) having a crosslinkable reactive group, and a curing agent, wherein a fluorine content of the fluorine-containing polymer (A) is not less than 10% by weight and a content of the vinyl versatate unit and/or vinyl benzoate unit in the fluorine-containing polymer (A) is from 1 to 30% by weight.

2. A thermosetting powder coating composition which comprises a polyester polymer (I) containing 1,4-cyclohexane dicarboxylic acid as the essential component and having a crosslinkable reactive group, a thermosetting fluorine-containing polymer (IIa) having a crosslinkable reactive group and having a fluorine content of not less than 10% by weight, and a curing agent.

3. The powder coating composition of claim 2, wherein said polyester polymer (I) is a polyester polymer containing 1,4-cyclohexane dicarboxylic acid as a poly basic acid component and a polyhydric alcohol as a polyol component, in which hydrogen at β position has been substituted by an alkyl group.

4. The powder coating composition of claim 2, wherein the thermosetting fluorine-containing polymer (IIa) has a MFR of 1 to 100 g/10 min. measured at 100 to 180° C.

5. The powder coating composition of claim 2, wherein the thermosetting fluorine-containing polymer (IIa) has a glass transition temperature of 30 to 120° C.

* * * * *